(12) United States Patent
Joseph et al.

(10) Patent No.: US 6,606,603 B1
(45) Date of Patent: Aug. 12, 2003

(54) METHOD AND APPARATUS FOR ORDERING ITEMS USING ELECTRONIC CATALOGS

(75) Inventors: Joshy Joseph, San Francisco, CA (US); Boris Putanec, Menlo Park, CA (US)

(73) Assignee: Ariba, Inc., Sunnyvale, CA (US)

( * ) Notice: Subject to any disclaimer, the term of this patent is extended or adjusted under 35 U.S.C. 154(b) by 0 days.

(21) Appl. No.: 09/276,921

(22) Filed: Mar. 26, 1999

Related U.S. Application Data (63) Continuation-in-part of application No. PCT/US98/08407, filed on Apr. 27, 1998.
(60) Provisional application No. 60/044,372, filed on Apr. 28, 1997.

(51) Int. Cl.⁷ .............................................. G06F 17/60
(52) U.S. Cl. ............................... 705/26; 705/1; 705/27
(58) Field of Search ............................. 705/26–27, 37, 705/1, 30; 235/385; G06F 17/60, 15/22

(56) References Cited

U.S. PATENT DOCUMENTS

| | | | |
|---|---|---|---|
| 3,899,775 A | 8/1975 | Larsen | 340/172.5 |
| 4,734,858 A | * 3/1988 | Schlafly | |
| 4,774,663 A | 9/1988 | Musmanno et al. | 364/408 |
| 4,796,292 A | 1/1989 | Thomas | 379/91 |
| 4,799,156 A | 1/1989 | Shavit et al. | 364/401 |
| 4,812,994 A | 3/1989 | Taylor et al. | 705/400 |
| 4,897,867 A | 1/1990 | Foster et al. | 379/93.12 |
| 4,947,028 A | 8/1990 | Gorog | 235/381 |
| 4,951,196 A | 8/1990 | Jackson | 364/401 |
| 4,984,155 A | 1/1991 | Geier et al. | 364/401 |
| 4,992,940 A | 2/1991 | Dworkin | 364/401 |
| 4,999,806 A | 3/1991 | Chernow et al. | |
| 5,021,953 A | 6/1991 | Webber et al. | 364/407 |
| 5,063,506 A | 11/1991 | Brockwell et al. | 364/402 |
| 5,063,507 A | * 11/1991 | Lindsey et al. | 705/26 |
| 5,224,034 A | 6/1993 | Katz et al. | 364/401 |
| 5,270,922 A | 12/1993 | Higgins | 364/408 |
| 5,285,383 A | * 2/1994 | Lindsey et al. | 705/26 |
| 5,319,542 A | * 6/1994 | King, Jr. et al. | 705/27 |
| 5,355,474 A | 10/1994 | Thuraisngham et al. | 395/600 |

(List continued on next page.)

FOREIGN PATENT DOCUMENTS

| | | | | |
|---|---|---|---|---|
| AU | 1995-344753 | * | 9/1995 | G06F/17/60 |
| JP | 4247567 A | | 9/1992 | |
| US | 1999-153231 | * | 2/1999 | G06F/153/00 |
| WO | 009428497 A1 | * | 12/1994 | G06F/17/60 |
| WO | 009526004 A1 | * | 9/1995 | G06F/17/60 |

OTHER PUBLICATIONS

Seiders, Attention, retailers! how convenient is your convenience strategy?, Slan management Review, Spring 2000.*

(List continued on next page.)

*Primary Examiner*—Cuong Nguyen
(74) *Attorney, Agent, or Firm*—Blakely Sokoloff Taylor & Zafman LLP (57) ABSTRACT

A system for electronically ordering items having at least one supplier computer system for storing at least one catalog containing the items offered by a supplier and a customer computer system with the improvement of a public computer system comprising an index to the items in the catalogs on the at least one supplier computer system, means for querying the index on the public computer system for a desired item in response to a request for the desired item from the customer computer system and means for generating a pointer for the customer computer system to catalog information about the desired item in the catalog on the at least one supplier system which has been identified by the query of the index.

3 Claims, 7 Drawing Sheets

U.S. PATENT DOCUMENTS

| | | | |
|---|---|---|---|
| 5,361,199 A | 11/1994 | Shoquist et al. | 364/401 |
| 5,455,406 A | 10/1995 | Terashima et al. | 235/379 |
| 5,465,206 A | 11/1995 | Hilt et al. | 364/406 |
| 5,475,585 A | 12/1995 | Bush | 364/401 |
| 5,504,893 A | 4/1996 | Kawashima et al. | 395/600 |
| 5,515,268 A | 5/1996 | Yoda | 364/401 |
| 5,528,490 A | 6/1996 | Hill | 364/403 |
| 5,544,040 A | 8/1996 | Gerbaulet | 705/26 |
| 5,557,518 A | 9/1996 | Rosen | 364/408 |
| 5,592,375 A | 1/1997 | Salmon et al. | 705/7 |
| 5,592,378 A | 1/1997 | Cameron et al. | 705/27 |
| 5,623,660 A | 4/1997 | Josephson | 395/609 |
| 5,666,493 A | 9/1997 | Wojcik et al. | 705/26 |
| 5,694,551 A | 12/1997 | Doyle et al. | 705/26 |
| 5,712,906 A * | 1/1998 | Grady et al. | |
| 5,715,399 A * | 2/1998 | Bezos | 705/26 |
| 5,721,832 A | 2/1998 | Westrope et al. | 705/27 |
| 5,727,163 A * | 3/1998 | Bezos | 705/28 |
| 5,758,327 A * | 5/1998 | Gardner et al. | 705/26 |
| 5,758,328 A * | 5/1998 | Giovannoli | 705/26 |
| 5,758,329 A | 5/1998 | Wojcik et al. | 705/26 |
| 5,799,157 A * | 8/1998 | Escallon | 705/27 |
| 5,799,289 A | 8/1998 | Fukushima et al. | 705/400 |
| 5,802,283 A * | 9/1998 | Grady et al. | |
| 5,808,894 A | 9/1998 | Wiens et al. | 364/479.01 |
| 5,870,717 A * | 2/1999 | Wiecha | 705/26 |
| 5,963,915 A * | 10/1999 | Kirsch | |
| 5,970,475 A * | 10/1999 | Barnes et al. | 705/27 |
| 6,014,641 A * | 1/2000 | Loeb et al. | 705/34 |

OTHER PUBLICATIONS

From Dialog(R) file 180 acc. No. 02222578, Department of Defense acquisition regulations., v.56 issue 31, p. 6056, Feb. 14, 1991.*

From Dialog(R) file 542, acc. No. 1806161, Waxman Industries, Inc. 1995 report., Jun. 30, 1995.*

From http://www.findarticles.com, Store supplies: essential products that enhance the retail environment, Gifts & Decorative Accessories, Feb. 2002.*

From URL http://www.kbb.com/, "Kelly Blue Book, kbb—guiding the car buyer", 1993.*

From URL http://www.gmbuypower.com/, "Welcome to GM Buy power—My Files".*

Jeremy Carl, Bookseller's online ambitions—Amazon.com knows competitors can't be far behind, WebWeek, v1n6 p17, 20 (from DialogClassic Web(tm)), Oct. 1995.*

Amazon.com, Inc., Amazon.com Books, from URL http://www.amazon.com/, 1996–2001.*

From DialogClassic Web(tm), file 646: "Buying Online. Report. Shopping goes online (Here's how to save time and money –and avoid hassles –when buying on the web)", Consumer Reports: v63n11, pp. 18–23, Nov. 1998.*

Cohen, E–mail basics, Training & Development, v50, n8 p48(3), Aug. 1996 (Dialog Classic Web(TM) file 75).*

From Dialog Classic Web(TM) file 16, Web browsers flood the market, Interactive Content, v1, n7, Nov. 1994.*

Bascombe et al., Using the Internet for tourism research: "Information Highway". . . , Jour. of Travel & Research, v34, n4, p. 66–70, Spring 1996 (Dialog file 13).*

Unknown. Technology Spares Buyers the Hassle of Maintaining Catalogs. Purchasing. Apr. 23, 1998, vol. 124, No. 6, p. 91.*

Dalton, G. Actra to Help Purchasing. InformationWeek, Nov. 10, 1997, No. 656, pp. 84–85.*

Operating Resource Management—Leveraging the "Total Spend" of a Company. Killen & Associates. Jun 23, 1997 [retrieved on May 24, 2000]. Retrieved from the Internet: <URL:www.summitonline.com/sysmanage/papers/killen1.html>.*

Harrison, D. Web–Buying Extension Unveiled for R/3. ENT. Aug. 20, 1997, vol. 2, No. 12, p. 3.*

Unknown. Industry Briefs. Electronic Commerce News, Jan. 5, 1998, vol. 3, No. 1.*

SAP Australia and New Zealand [Sapient College] R/3 Release 3.0 Training (Improving Business Results Through Training http://www.sap.com/australia/sapient/customer/53/5307/desc.htm 7 pages.

Microsoft Press Pass Microsoft Announces Implementation of SAP's Human Resources: Solution http://www.microsoft.com/corpinfo/press/1997/May 97/SAPHRpr.htm 2 pages.

SAP AG [Press Information Center] "SAP and Aspect Team Up to Reduce Manufacturers' Procurement Costs and Time to Market" http://www.sap.com/press/de 02 97.htm Press Releases February.

SAP AG [SAP Business Information Warehouse Information Center] "SAP Business Information Warehouse–Functionality" http://www.sap.com/products/biw/biw_func.htm 2 pages.

SAP Business Information Warehouse Technology Copyright 1997 SAP AG. All rights reserved, 22 pages.

SAP "Direct Link Integrated Web–based Catalog and Purchase Requisition System" Development & Technology. 2 pages.

Written by Technology Marketing, SAP AG "R/3® System Benefits of the Business Framework" Copyright 1997 SAG AG. All rights reserved.

SAP "Business Information Warehouse A ready–to–go data warehouse for R/3, complete with integrated business know–how" Copyright 1997 SAP AG. All rights reserved. 13 pages.

Nelson Matthew "Commerce One Inks Integration Deals with SAP, Microsoft" Info World Electric (Info Whttp://www.infoworld.com/cgi–bin/displayShow.pl?971210.icommerce1.htm Mar 23, 1998, 2 pages.

Fisher Technology Group "CornerStone, A "Net" Solution for Both Buying and Selling Organizations" http://www.ftechg.com/stone.html, 7 pages.

ProcureNet http://www.procurenet.com/features.htm.

http://www.ftechg.com/product.html "Products and Services" Web Commerce Solutions Copyright 1997 Fisher Technology Group, 2 pages.

http://www.commerceone.com/products/sub).htm "The C–1 Commerce Chain" Commerce One: Products, 8 pages.

IBM Fisher Technology Group (to Market Commerce Solutions) "Network Computing" http://www.internet.ibm.com/new/2af2.html Sep. 9, 1997.

Andrews, Whit "E–Commerce Firm Bets On Software for Buying, Not Selling" http://www.internetworld.com/print . . . /11/17/industry/19971117–firm.html, Nov. 17, 1997.

Strohecker, James & Berkowitz, Todd Content Introduces Purchasestream: Internet–Based Application Software To Streamline Corporate Purchasing. http://www.connectinc.com/whatsnew/pstream.htm. 5 pages.

http://www.connectinc.com/products/QS_catalogmgmt.html Quickstart for OrderStream Catalog Management, 1 page.

Berst, Jesse "Business-to-Business E-Commerce Poised for Growth" Jesse Berst's Anchor Desk, your source of tech intelligence. http://www.zdnet.com.au/anchordesk/storys/story_1003.html. Jun. 16, 1997. 2 pages.

Phil's Pretty Good Software Presents Pretty Good(tm) Privacy Public Key Encryption for the Masses, PGP(tm) User's Guide vol. II: Special Topics by Phillip Zimmermann, Revised Oct. 11, 1994.

* cited by examiner

METHOD AND APPARATUS FOR ORDERING ITEMS USING ELECTRONIC CATALOGS

RELATED APPLICATIONS

This application is a continuation-in-part of International Application No.: PCT/US98/08407 filed Apr. 27, 1998 published as International Publication Number WO 98/49644 on Nov. 5, 1998 which claims priority from U.S. application Ser. No. 60/044,372 filed Apr. 28, 1997.

TECHNICAL FIELD

The present invention relates to e-commerce systems and, specifically, to a highly distributed system for large-scale content and e-commerce transactions over global computer networks, such as the internet.

BACKGROUND

The network economy is rapidly taking shape, and electronic commerce (eCommerce) is at the forefront of this emerging paradigm. The eCommerce opportunity is expected to explode to over 1.1 trillion dollars by the year 2002, according to several industry analysts. The business-to-business sector will capture the majority of the dollars transacted for eCommerce, an estimated 800 billion dollars.

A closer examination reveals the bulk of the spending activity associated with business-to-business eCommerce will originate from the acquisition of "operating resources", the goods and services required to operate an enterprise.

Acquiring operating resources is ideal for eCommerce because traditionally they are acquired in a manual, paper-intensive manner—prone to error, mistakes and inefficiencies. The expected savings associated with reducing the costs of acquiring operating resources ranges from 5–15%. Considering the dollars spent by a typical manufacturing corporation, resulting savings can have a significant bottom line benefit.

Conventionally, though, each supplier is "on its own" to provide its own buying relationship with customers. This has the disadvantage the supplier's system is not linked into the buyer's processes (e.g., for approval and procurement). Thus, a system like OBI (Open Buying on the Internet, see http://openbuy.org) is desirable to "glue" the supplier's system to the buyer's system. Unfortunately, OBI still has the disadvantage that the end user doesn't necessarily know which supplier has the goods he wants. This is a fundamental failing of basic OBI, since a primary task an end-user must perform when purchasing something is to find what he wants.

In order to deliver the expected benefits associated with business-to-business eCommerce, it is desirable that a solution provide:

Enterprise Connection of Users, Processes and Systems
Scalable Connection of Buyers and Suppliers.

Figure 1:
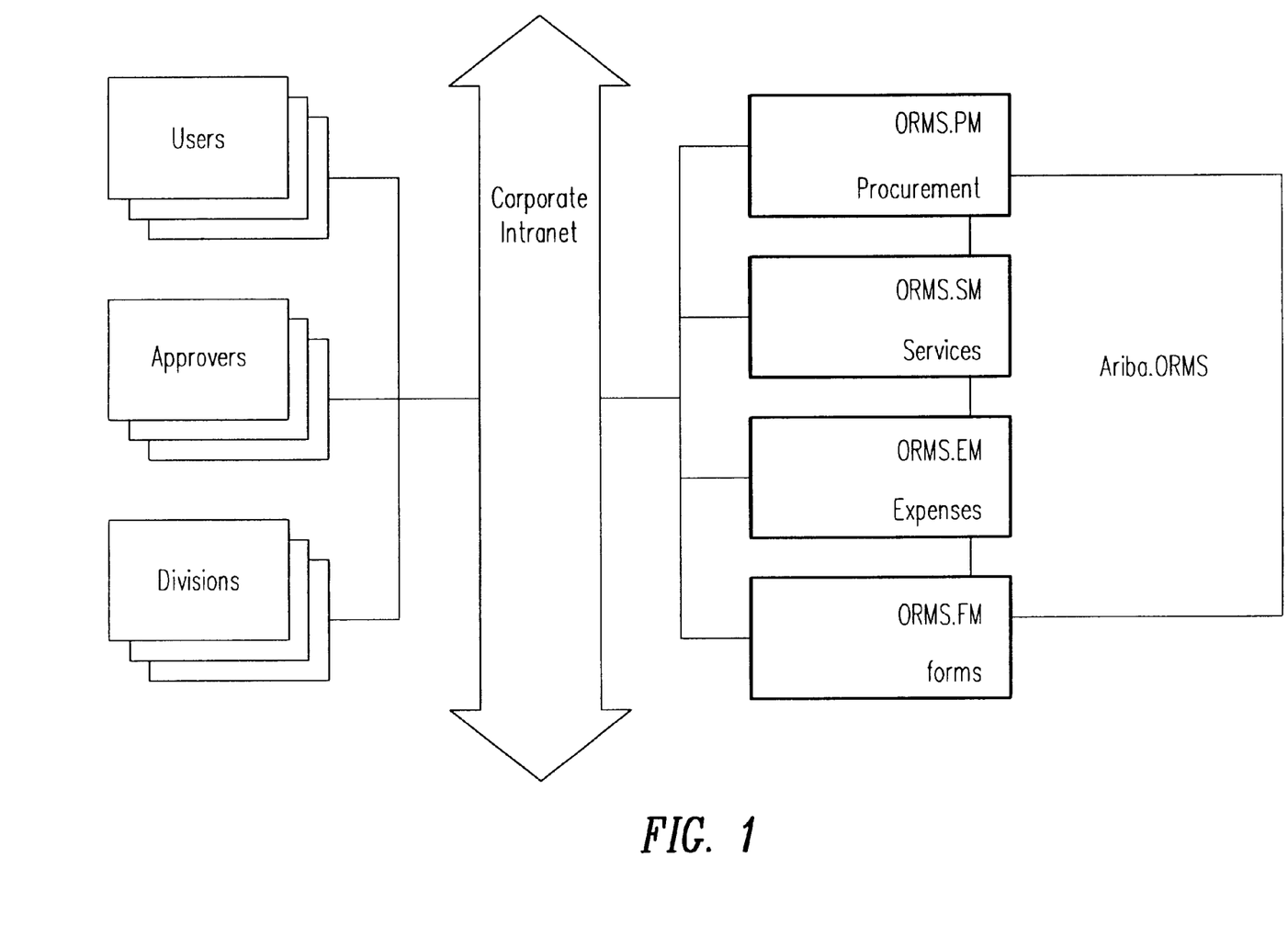
FIG. 1 shows schematic block diagram view of a conventional Ariba ORMS.

The Operating Resource Management System (ORMS), from Ariba Technologies, Inc. of Sunnyvale, Calif. is a customer-driven solution that enables buying organizations to achieve significant savings in acquiring operating resources. The Ariba ORMS is described in detail in referenced International Application No. PCT/US98/08407 filed Apr. 27, 1998 of which this application is a continuation-in-part and the contents of which are hereby incorporated herein by reference. An example of how the Ariba ORMS is used within an enterprise is provided in FIG. 1. The Ariba ORMS can do the following:

Network Enabling Buyers;
Capturing Procurement Processes and Spending;
Network Enabling Enterprise Systems.

Conventionally, buying organizations use the Ariba ORMS to enable their corporate community of users, approvers and related departments to acquire all of their operating resources via a single, common networked infrastructure. The Ariba ORMS executes on a customer's corporate intranet. Ariba ORMS provides a user access to catalogs that are stored on the user's own intranet system, and the Ariba ORMS channels the users to products and services from preferred suppliers while simplifying the numerous processes (e.g., approval within the organization) of acquiring operating resources. In addition, users have cross-process visibility and are able to reference relevant information regarding the status of their requests.

The capture of all operating resources spending is important to achieving significant savings in acquiring these resources. Typically, different spending categories require unique procurement processes to request, approve and purchase the items of interest. The Ariba ORMS facilitates an easy to understand presentation of each process to the user, so complexity is minimized, while still allowing the enterprise to model sophisticated process scenarios. In addition, internal acquisition processes are available within the Ariba ORMS, such as I/T service requests or new employee kits. Complete operating resources spend and process capture drives maximum savings, as well as allowing for global collaborative buying across the enterprise.

Figure 2:
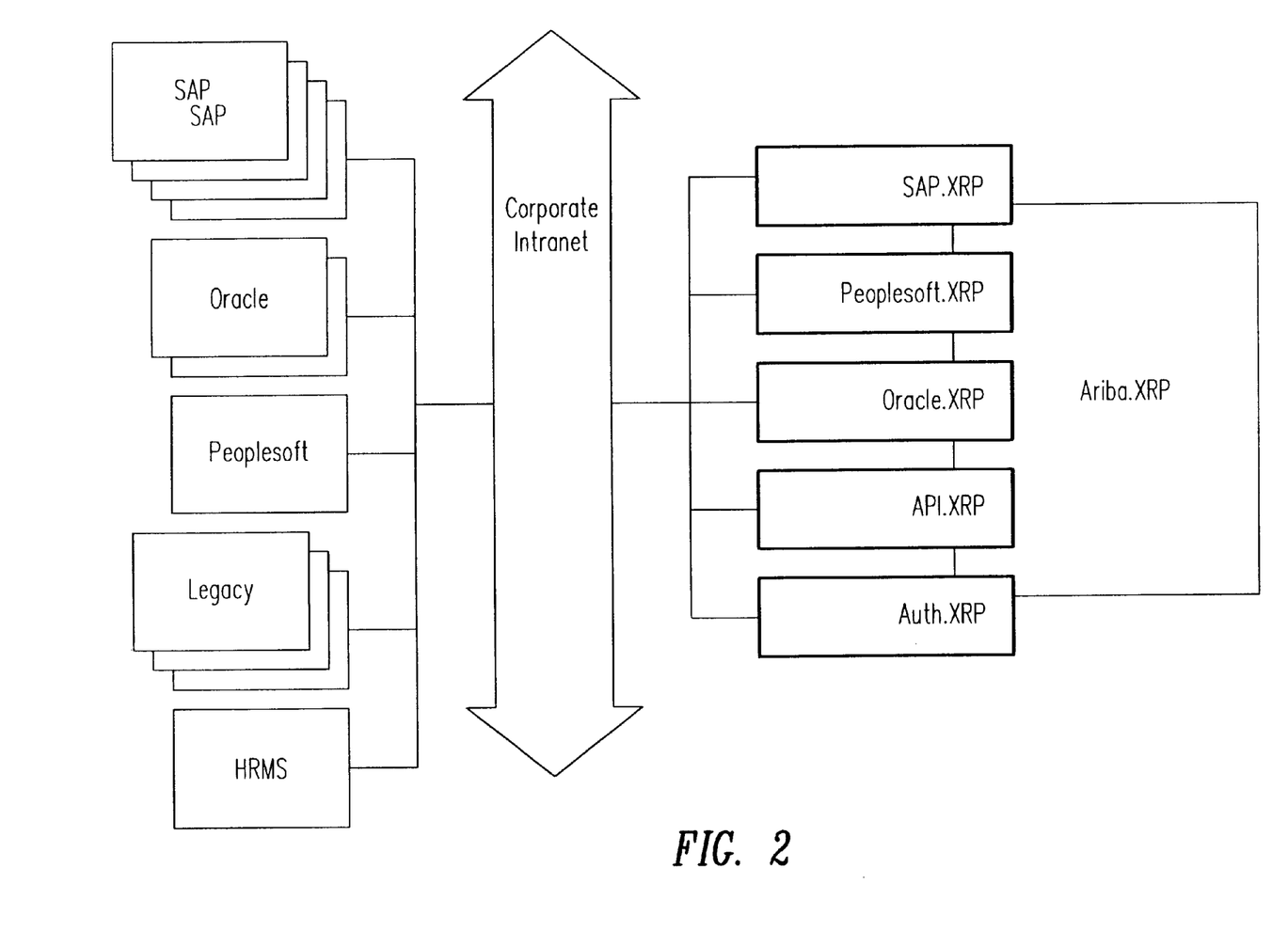
FIG. 2 is a schematic diagram which shows how enterprise resource planning systems integrate seamlessly into the Ariba ORMS.

A large number of large corporations require a heterogeneous enterprise resource planning systems environment. The seamless integration of these systems into the Ariba ORMS, as shown in FIG. 2, facilitates networked information flow and provides for complete leverage of important information such as financial, human resource, security, inventory, messaging and other related data.

The adoption rate of business-to-business eCommerce systems is rapidly growing. In particular, the Ariba ORMS is a leader among global 2000 and mid-size corporation.

Ariba's customer success and market leadership has created a critical mass of buying organizations that represent tens of billions of dollars of annual spending on operating resources. Each Ariba customer represents a network of people, systems and processes that govern the acquisition of operating resources for their enterprise.

The critical mass of buyers and the associated buying power has led to exponential supplier demand for participation. The supplier demand drives requirements for massive integration of product and service content. In addition, eCommerce transactions such as purchase orders, acknowledgements, change orders, order & ship status and invoices require massively scalable integration.

Existing solutions to large-scale integration of supplier content and eCommerce transaction integration include:

Peer-to-Peer Networks
Many-to-One-to-Many Networks
Single Standard Networks

Peer-to-Peer Networks, such as Electronic Data Interchange (EDI), connect individual buying and selling organizations in a one-to-one manner. Electronic commerce has traditionally based interoperability on these one-to-one connections and Peer-to-Peer Networks have been quite effective for acquiring production and manufacturing resources.

However, operating resources are non-manufacturing goods and services acquired from thousands of suppliers, each with widely varying technical capabilities. Therefore, while Peer-to-Peer networks facilitate connections between buyers and suppliers, they are difficult to scale across the thousands of organizations that supply operating resources. This is due to the complexity and cost of establishing each one-to-one communication scenario.

Many-to-One-to-Many Networks provide a central repository or location for all content and transaction activity All buying activities are channeled through the central hub while all supplier interactions flow from the central hub. These networks aggregate supplier content in order to provide an effective means to find products or services of interest across multiple selling organizations. Aggregation of supplier content relies on normalization of the content where multi-sourcing of items is required. A system that aggregates supplier content in a public computer system is disclosed in U.S. Pat. No. 5,319,542 to King, Jr. et al.

Data normalization is the process of defining common descriptions and attributes for the same or similar products offered by different suppliers. To perform this function effectively, domain expertise must exist in the industry or product area requiring normalization. Lack of domain expertise creates content aggregation challenges for Many-to-One-to-Many Networks.

While providing central control for the aggregation of supplier content, Many-to-One-to-Many Networks create bottlenecks that significantly limit the scalability of the network. These bottlenecks act as "choke points" for the network unless effective and efficient aggregation techniques based on relevant domain-based content expertise are used. Furthermore, at some point the amount of data to be aggregated simply becomes too large to be effectively and efficiently aggregated by any method. This type of system that aggregates supplier content simply will not easily scale to support a general system, since there are literally hundreds of thousands of suppliers and billions (or even perhaps, trillions) of items. In addition, as a practical business matter, it is a disadvantage to suppliers to be at the mercy of a third party to provide a selling interface to their customers. (They want to "own" their customers' buying experience with them.) Also, as a practical technical matter, suppliers must do a lot of work to "conform" to the aggregation system.

As for single standard networks, although an ideal theoretical concept, the adoption of a single standard for content and eCommerce transaction integration is highly unlikely. Several industry and geography-based initiatives exist to create common semantics for content and common formats for transactions, resulting in multiple standards. These initiatives seek to optimize communication, distribution and connection efficiencies within the industry or geographic region in addition to reducing associated costs.

SUMMARY OF THE INVENTION

The present invention is directed to method and apparatus providing a large scale eCommerce integrated buyer-seller product and/or service procurement system including identification, offer, order and payment transactions.

The invention includes providing to buyers index information and directions to distributed supplier information which identifies goods and services of suppliers and providing ordering services to buyers and sellers by means of a global computer information network. The invention also includes order transaction routing, multiple protocol support for exchanging content and transaction information and for converting an order into the supplier's preferred transaction protocol.

Broadly stated the present invention is directed to a system for electronically ordering items having at least one supplier computer system storing at least one catalog containing items offered by the supplier and a customer computer system with the improvement of a public computer system comprising an index to the items in the catalogs on the at least one supplier computer system, means for querying the index on the public computer system for a desired item in response to a request for the desired item from the customer computer system and means for generating a pointer for the customer computer system to catalog information about the desired item in the catalog on the at least one supplier system which has been identified by the query of the index.

In accordance with another aspect of the present invention, the public computer system includes means responsive to an order from the customer computer system for electronically ordering the desired item based upon the catalog information about the desired item accessed by the customer from the at least one supplier computer system.

The invention also includes the method of electronically ordering item which are listed in a catalog on one supplier's computer system for a customer having its own computer system and utilizing a public computer system comprising the steps of creating and storing on the public computer system an index to the items in the catalogs on the supplier computer system, querying the index on the public computer system for a desired item in response to a request for the desired item from the customer computer system and generating a pointer for the customer computer system to catalog information about the desired item in the catalog on the supplier system.

Another aspect of the present invention is utilizing the method set forth in the preceding paragraph and then ordering the desired item from the public computer system responsive to an order to the public computer system from the customer computer system.

DETAILED DESCRIPTION OF THE PREFERRED EMBODIMENT

The present invention is the solution to large-scale content and eCommerce transaction integration. The invention is an entirely new paradigm that leverages networked economies of scale of the Internet. The invention provides a highly scaleable and distributed means of connecting the rapidly growing number of buyers using Ariba ORMS (or other customer-based systems) with a large number of suppliers. The invention also provides a range of Internet services for buyers and suppliers that accelerates the inherent advantages of business-to-business eCommerce and lowers the barriers of entry to participants. In addition to providing smooth access to supplier content and transparent transaction routing, in some embodiments, invention delivers business and information services as well.

The World Wide Web (or other global information network) provides an excellent medium for suppliers to offer their products and services to customers and prospective customers. Suppliers are able to create unique branding of their offerings as well as establish competitive differentiation. The present invention leverages the scalability of the web's distributed many-to-many architecture by facilitating the use of heterogeneous supplier content managed by the supplier via their own eCommerce systems.

The invention provides support for numerous standard ways of exchanging content and transaction information. Preferred embodiments of this multi-protocol network allow buyers to send transactions (e.g., purchase requisitions) from Ariba ORMS in one standard format, which are then automatically converted into the suppliers' preferred transaction protocol. This infrastructure eliminates the reliance on a single standard for electronic commerce while giving suppliers the freedom to transact in their preferred protocol. As additional standard transaction and content protocols emerge, the invention may implement them.

The invention uses a unique and highly scalable approach for content management. This approach uses indexing, rather than content aggregation, to connect buying organizations using Ariba ORMS to suppliers' catalogs. This indexing approach eliminates the need to aggregate content in a central repository, yet provides robust and comprehensive searching tools to buyers. The invention may be thought of as a portal—a doorway through which a buying organization passes to access information about what is available in the marketplace.

The invention offers buying organizations the option of linking to approved supplier Web sites, sourcing goods and services through indices maintained with the invention, or caching indices of operating resources directly in Ariba ORMS, or both. It also allows suppliers to conduct business with buying organizations independent.

The ubiquity of the Internet and the widespread connectivity it provides to buyers and suppliers makes it a low cost and scalable platform for eCommerce. The invention leverages this platform to achieve a secure, open and scalable content and transaction integration infrastructure.

Figure 3:
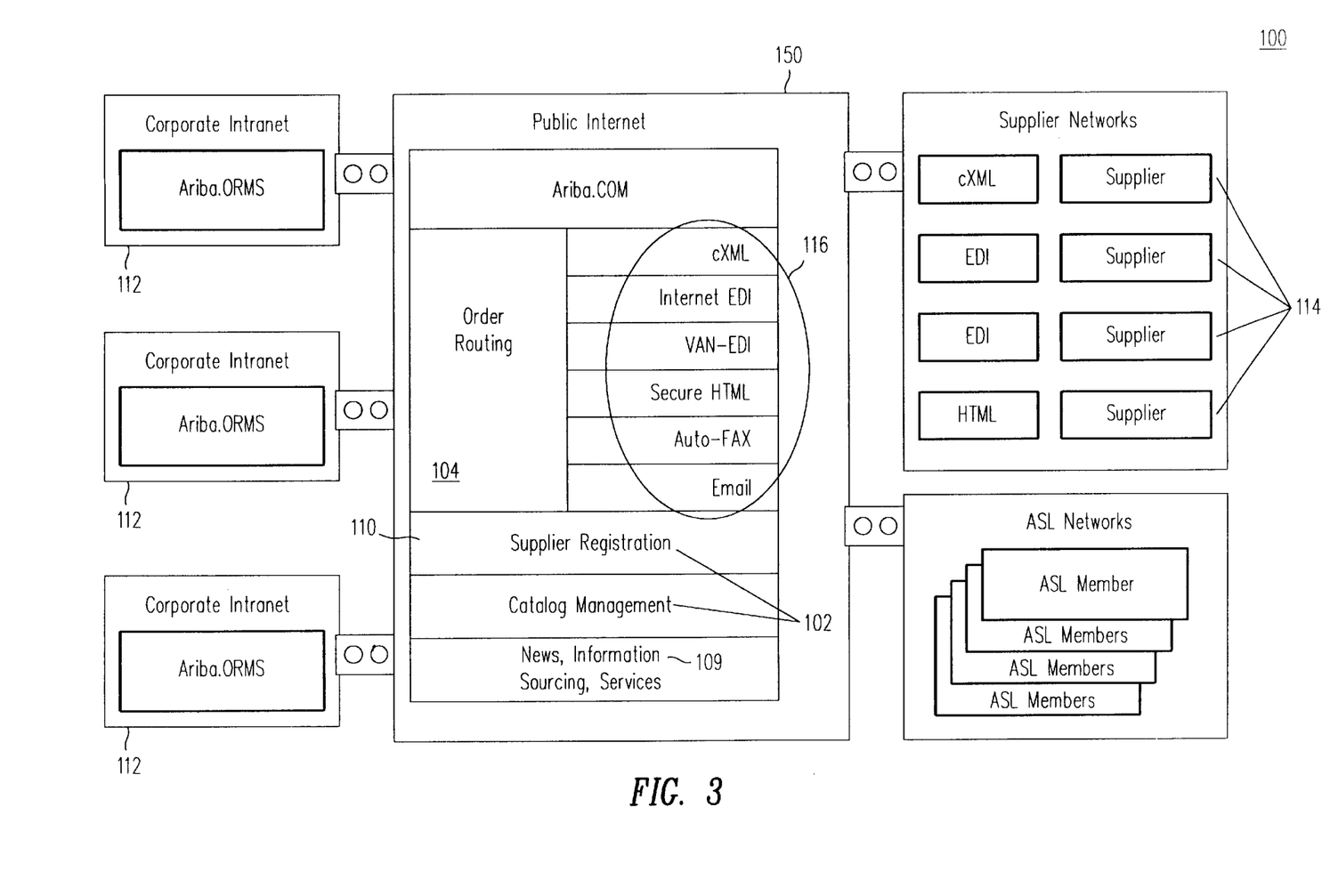
FIG. 3 is a schematic block diagram illustrating an embodiment of the invention, including showing how the invention integrates with buyer organizations and supplier organizations.

As shown in FIG. 3, the public computer system 150 of this invention is a highly distributed solution for large-scale content and eCommerce transaction integration over the Internet. It provides a range of services for buying and selling organizations that accelerate the inherent advantages of a Networked ecosystem for business-to-business eCommerce. It also incorporates a number of Internet services, including catalog content management 102, order transaction routing 104, and multi-protocol support 106 for numerous standard ways of exchanging content and transaction information.

For buying organizations 112, the system 150 links them into a single coterminous network making if far easier for buyers to conduct eCommerce with many suppliers. Similarly, for selling organizations 114, the system 150 links buyer networks 112 together in a seamless network environment making it easier for a suppliers 114 to conduct eCommerce with many buyers 112.

Figure 4:
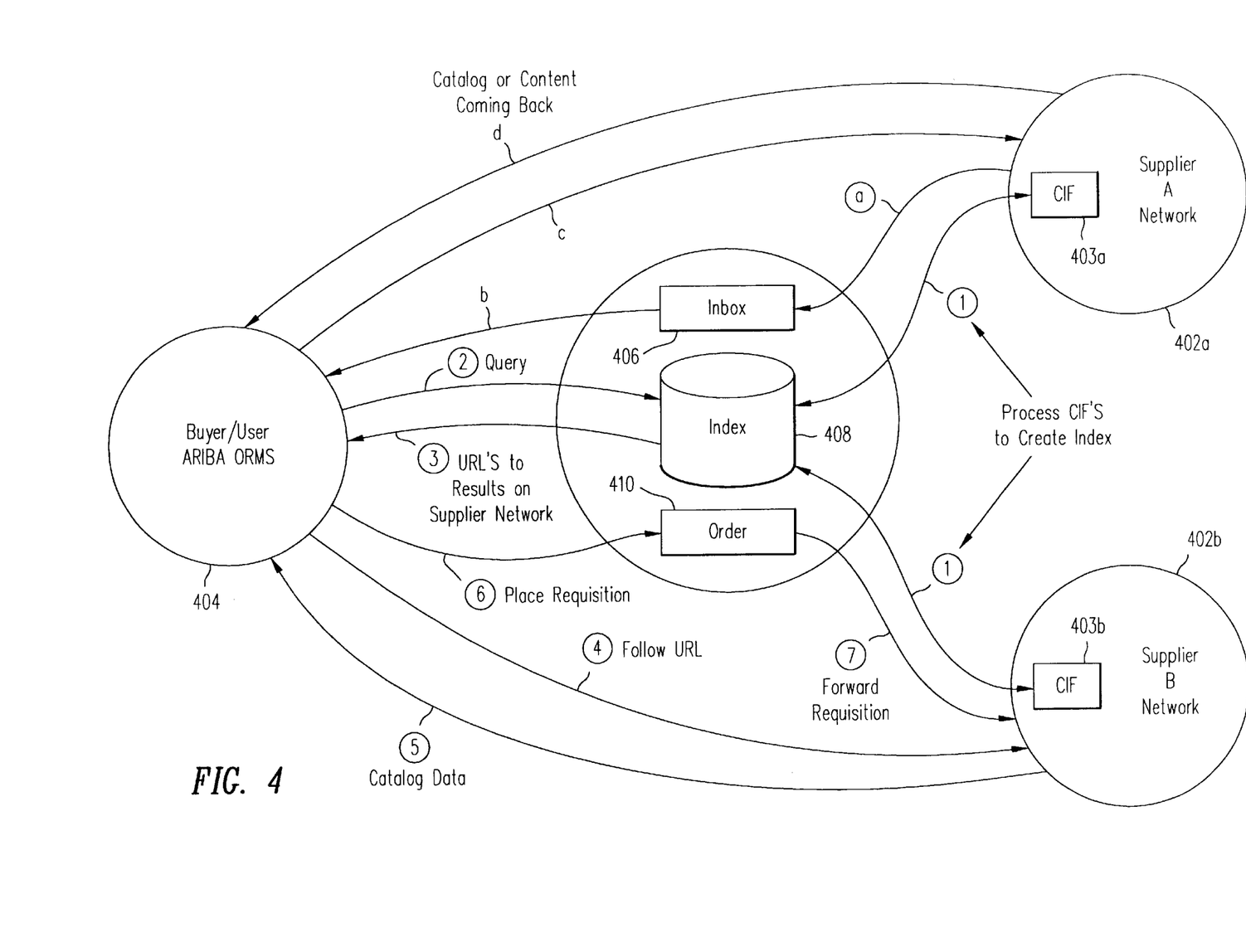
FIG. 4 is a schematic block diagram illustrating a method for ordering an operating resource from supplier catalogs, using the invention.

Referring to FIGS. 3 and 4, supplier catalogs are stored on supplier networks 114 in a standard Catalog Interchange Format (CIF) 403*a* and 403*b*. An index 408 to the supplier catalogs 403 is created and stored on the system server 150. (This step is denoted as "1" in the figure.) When a customer using Ariba ORMS 404 wishes to purchase an item, he submits a query to the system server 406 (step 2). Software on the system server 406 searches the index 408 on the system server 406 based on the customer submitted query and returns, as the search result, universal resource locators (UTRL's) pointing to catalog data on the appropriate supplier network 402*a* and 402*b*(step 3).

The customer 404 follows one or more URL's (step 4) to retrieve the catalog data directly from the supplier network (in this case from supplier B network 402*b*) (step 5). Based on the catalog data retrieved from the supplier network 402*b*, the customer using Ariba ORMS 404 generates a requisition and submits the requisition via ordering software 410 on the system server 406 (step 6). The ordering software 410 translates the requisition into a format desired by the particular supplier to which the requisition is destined, and forwards the requisition on to the supplier network 402*b* (step 7) in most cases. The system services include:

Supplier Registration 110

Order Transaction Routing 104

Catalog Content Management 102

Community News and Information 109

Future Services (not shown)

Figure 5:
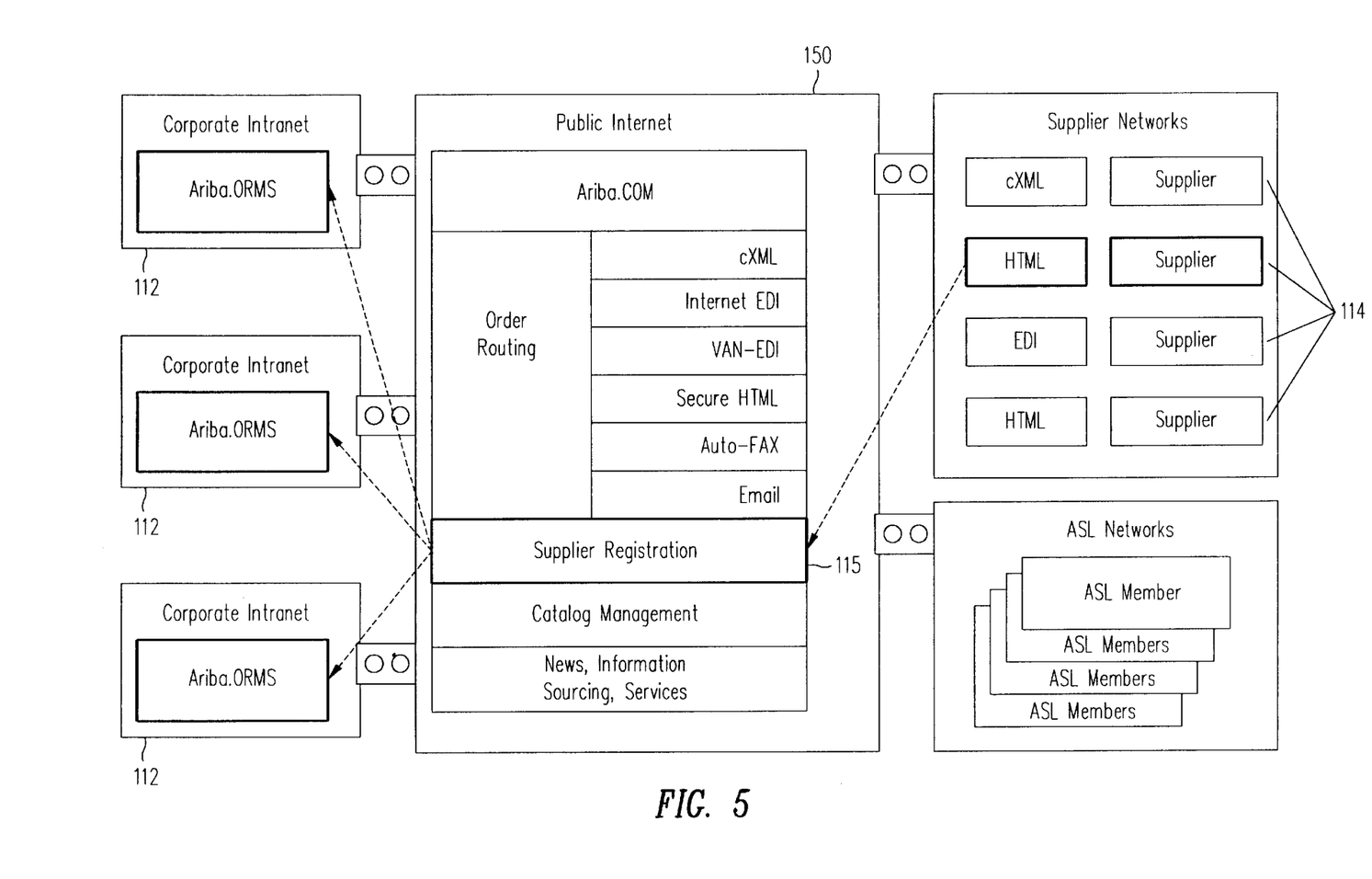
FIG. 5 is a schematic block diagram illustrating how suppliers register contact formation with the invention.

FIG. 5 shows how the system 150 provides a single self-service network access point 115 for suppliers to register their contact information, content data, order preferences and profile information—to tell the system 150 and, thus, buying organizations 112, where they are, how to communicate with them, where on the supplier's system 114 to find its catalogs, etc. Ariba ORM systems at buying organizations 112 may be automatically configured to use the system 150 to leverage the available supplier information. Any supplier 114 can join without the involvement of any buyer 112, thus creating an "open, free market".

To conduct commerce with all buying organizations using Ariba ORMS, suppliers 114 need only register once. This single point of access for suppliers makes the system 150 massively scalable, simplifying their business interactions with hundreds of business buyers.

Figure 6:
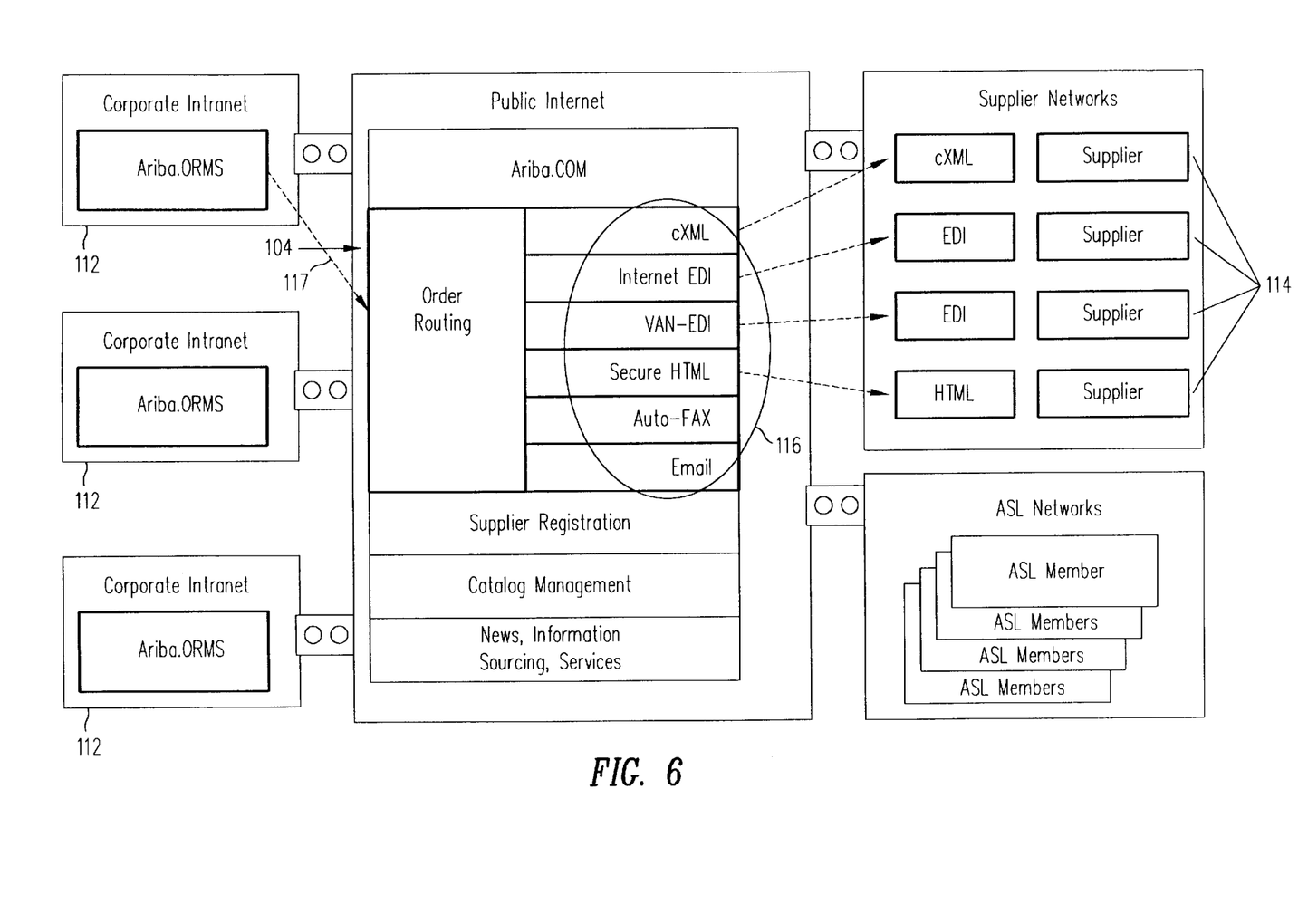
FIG. 6 is a schematic block diagram illustrating how the invention provide single access point for order processing.

Order transaction routing 104 is now discussed. As shown in FIG. 6, the system 150 creates a single network access point 117 for buyers 112 allowing them to send orders and conduct eCommerce with any supplier 114 connected to the system 150 without having to configure trading relationships, standards or content. That is, the buying organization 112 need know nothing about the preferred ordering methods of the supplier 114.

The system 150 routes orders from Ariba ORMS buyers 112 to appropriate suppliers 114 using the Internet. The connection between Ariba ORMS systems 112 to the system 150 occurs via an Order Sender Toolkit. The Order Sender Toolkit is an ordering module that securely transmits orders to the system 150 using encryption and secure transports. The system 150 order routing 104 provides secure and reliable order conveyance. Buyers 112 and suppliers 114 receive order confirmations as well as transaction histories and full audit trails. Comprehensive error handling capabilities exist for all stages of the transaction process.

The system 150 uses a scalable and reliable system for processing and routing electronic purchase orders. The system inserts orders as they arrive into a relational data store and places then into one or more queues also maintained in a relational data store. Several processes can run in parallel, each processing orders from one or more queues. Once an entry in a queue is processed, it is marked as such preventing duplicate processing. As the result of being processed via a queue by one of the processes, an order can get inserted into one or more other queues for further handling by other processes.

Row level locking is employed to avoid duplicate handling by processes running concurrently. The system uses intermediate states for entries to recover from abnormal situations such as hardware failures.

The system employs monitoring programs that can monitor the size of the various queues. It can start or stop processes on different machines on the network to process queues depending on their sizes. Thus, the system can process electronic orders in parallel in a reliable and scalable fashion.

Suppliers 114 can register their order transport and routing preferences 116 once via the system 150 to conduct business with any Ariba ORMS customer 112. They may change their preferences over time, for example as their internal systems become more sophisticated. The system 150 translates transactions between buyer 112 and supplier 114 preferred formats using major eCommerce standards as shown in FIG. 6. The level of technical enablement of the system 150 usually determines which ordering options they choose. In all cases, the buying organization 112 is free from the transaction complexity of supporting a myriad of order communications options. For example, order transport and routing options 116 may include:

Commerce XML (cXML);

Internet-based Electronic Data Interchange (Internet EDI);

Value Added Network-based Electronic Data Interchange (VAN EDI);

Open Buying on the Internet (OBI);

Remote driven supplier ordering web-site;

Secure HTML;

Electronic mail; and

Auto-Fax.

Additional order routing options may be included and/or added as requested by the system 150 supplier community.

Figure 7:
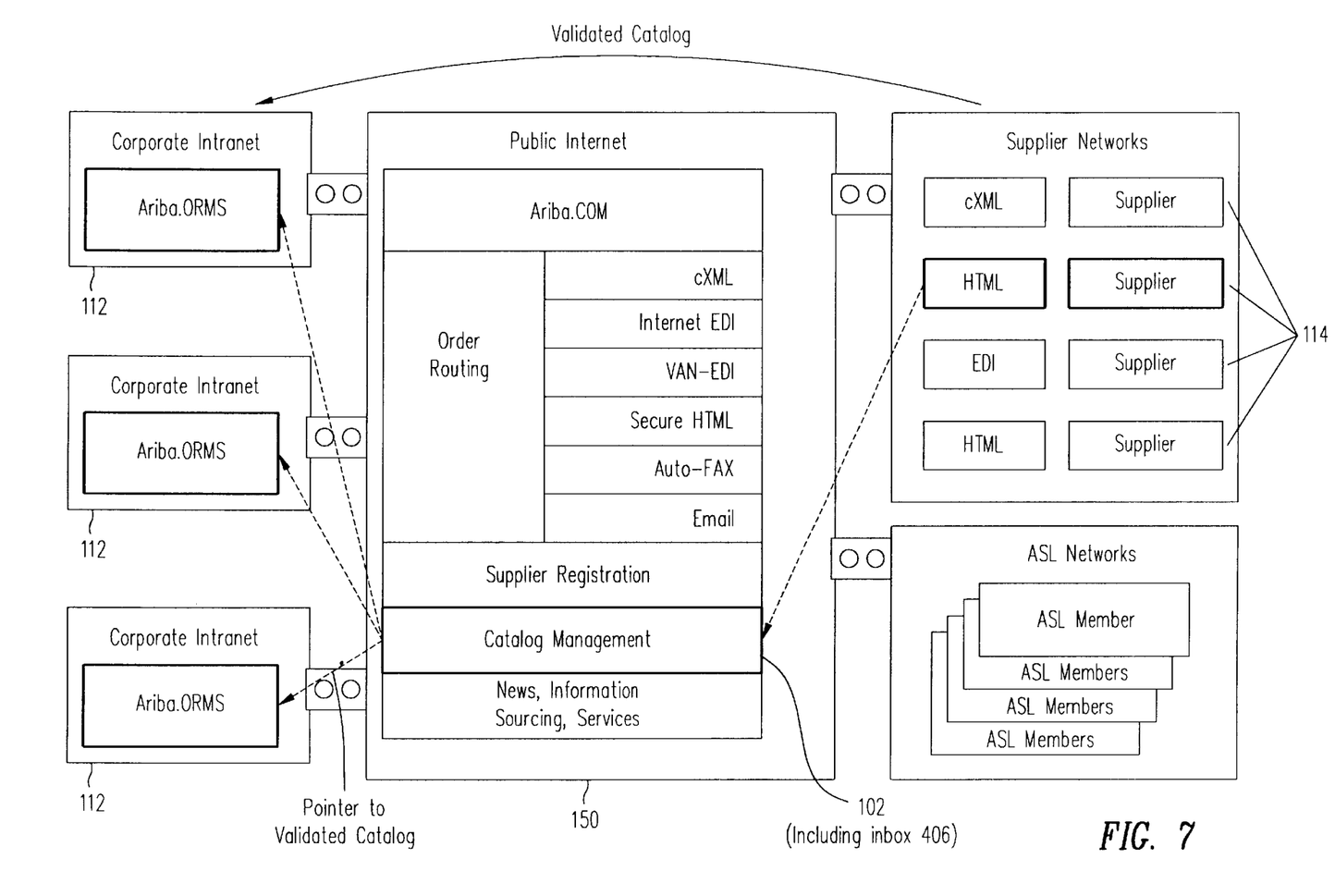
FIG. 7 is a schematic block diagram illustrating (along with a portion of FIG. 4) the content management service.

Catalog content management 102 service is provided. FIG. 7 shows how the system 150 provides a single access point for buyers and suppliers to manage and exchange catalog content directly between each other, such as through a URL. Several content management paradigms are available to equip buyers and suppliers with options appropriate to their business models.

With supplier managed content features, the system 150 provides suppliers with a full range of rich features to manage their catalog content. This allows publishing, again via URL, of buyer-specific product offerings, while also providing opportunities to participate in additional sales available from the system 150. For suppliers 114, the features available via the system 150 are effective for managing these product and service offerings. For buyers 112, the system 150 provides a full set of features that greatly simplifies content integration across multiple suppliers.

Supplier managed content features include:

Access as shown in FIG. 4 to catalog content from multiple suppliers 114 via "a" to a central "inbox" (406 in FIG. 4) and from the inbox via "b" to for buying organizations 112. Consistent with the distributed architecture of the system 150, the "inbox" has a URL or a pointer via "c" to the catalog content on the supplier system and not the catalog content itself which is transferred from the supplier to the buyer via "d".

Ability to validate and publish customer specific catalogs to the relevant buying organization, via the same "inbox" 408 mechanism;

Ability for buyers belonging to different organizations in a single company to exchange validated catalog content with others in the same enterprise;

Repository of indices to catalog data maintained at supplier sites for exchange and management of catalog content;

Bi-directional conversion of an index between catalog files in various formats;

Catalog content validation. Syntactic validation provides for the physical and positional accuracy of the supplier files (i.e. required fields exist, commas in the right place, numeric fields use numbers, etc.) Semantic validation provides for field level checking to ensure proper supplier identification is used, product classification codes are valid and other important parameters are valid within the context of the relevant buying organization;

Edit capabilities for catalog files that have errors as identified by the validation facility;

Wizard-driven supplier user interface;

Product classification look-up for catalog line items;

Summary information regarding catalog files in various stages, including those published to buyers, submitted by suppliers, submitted for validation, etc.

Increasingly, suppliers are desirous of building sophisticated business-to-business eCommerce systems that establish unique branding and competitive differentiation for corporate buying. For instance, a supplier may have a powerful configuration engine that a buyer uses to configure complicated products. The Ariba solution fully leverages these advanced systems to facilitate the buying process.

For example, in one embodiment, the Ariba Operating Resource Management System (Ariba ORMS) supports an advanced technique known as "punch-out." Punch-out is a supplier content integration model that uses eXtensible Markup Language (XML) and the supplier's advanced eCommerce system. From the Ariba ORMS, the punch-out technique allows the user to link to a supplier's eCommerce web-site. User authentication occurs via credentials that Ariba ORMS sends to communicate the user's organization and profile information. Once authenticated, the user 112 receives personalized greetings and content appropriate to their use that reflects their customer-specific pricing. The user 112 then finds products of interest using whatever facilities are available at the supplier's site 114 (e.g., a search engine on the supplier's site), and adds items to their supplier-based shopping basket. Finally, the secure transmission of the resulting product selections occurs to the user's requisition in the Ariba ORMS at the buying organization 112.

The system 150 provides community news and information as a service to buyers and suppliers. The dissemination of pertinent information and the enhancement of communication represent important objectives for the system. As such, the following are informational services and community forums planned.

Industry news, product reviews and events for suppliers;

Vertical community forums and messaging between buyers and suppliers;

Editorialized content regarding system 150 events, product releases and services;

Access to informational libraries such as Dun & Bradstreet and Hoovers for company or industry research;

Buyer sourcing guides;

Supplier evaluation and satisfaction ratings;

Buyer and supplier profile information;

Partner information.

In other embodiments, several additional services for buyers and suppliers using the system 150 may be provided, including:

Auctions for surplus materials;

Pre-negotiated supplier contracts;

Vertical industry buying consortiums;

Government contracts center;

RFP/RFI listing services;

Ad-hoc purchasing services;

Strategic sourcing.

The system 150 commerce solution has the two components that collectively provide seamless end-to-end integration of processes, systems and organizations involved in the acquisition cycle for operating resources. The Ariba ORMS provides the sophisticated global enterprise system that efficiently automates and connects internal users, systems and processes. The system 150 provides the secure and massively scalable Internet infrastructure for efficiently connecting buyers and suppliers.

With the system 150, Ariba ORMS users are seamlessly linked to supplier networks while suppliers are seamlessly linked to buyer networks to create a global purchasing network of operating resources. The synergy between the buying power of Ariba ORMS and the high-throughput supplier community of the system 150 results in new opportunities for return on investment and decreased costs of implementation and maintenance. The system 150 provides extended integration of corporate intranets, supplier extranets, the internet and private networks of value added content. This combination delivers an entire value chain via integration with important resources inside and outside the enterprise, and automate the interactions of trading partners.

What is claimed is:

1. A machine-readable medium having executable instructions to cause a machine to perform a method for electronically ordering items, the method comprising:

accessing a uniform resource locator (URL) on a public order catalog system, the URL to be one of a plurality of URLs, each URL to individually reference catalog data that describes a catalog item, the catalog data that describes each catalog item is to be stored on one of a plurality of supplier computer systems;

receiving the catalog data automatically from the supplier computer associated with the accessed URL, wherein the catalog data describes the catalog item from one of the plurality of supplier computer systems associated with the accessed URL;

receiving the catalog data that describes the catalog item from one of the plurality of supplier computer systems associated with the accessed URL;

creating a requisition order for the catalog item associated with the accessed URL, the requisition order to include a portion of the catalog data describing the catalog item; and submitting the requisition order for the catalog item to the supplier catalog data, wherein said requisiton order is converted automatically from a different format sent by a customer.

2. The computer program of claim 1, wherein the plurality of suppliers computer systems are associated with a plurality of suppliers, each of the suppliers being pre-approved to offer each catalog item for sale.

3. The computer program of claim 1, wherein each catalog item is pre-approved for sale.

* * * * *

UNITED STATES PATENT AND TRADEMARK OFFICE
CERTIFICATE OF CORRECTION

| | |
|---|---|
| PATENT NO. | : 6,606,603 B1 |
| APPLICATION NO. | : 09/276921 |
| DATED | : August 12, 2003 |
| INVENTOR(S) | : Joseph et al. |

It is certified that error appears in the above-identified patent and that said Letters Patent is hereby corrected as shown below:

Column 10, Lines 24-26 delete "receiving the catalog data that describes the catalog item from one of the plurality of supplier computer systems associated with the accessed URL;"

Column 10, Line 32, delete "supplier catalog data," and insert -- supplier computer system associated with the received catalog data, --

Column 10, Line 32 delete "requisiton" and insert -- requisition --

Column 10, Line 35 delete "The computer program" and insert -- The machine-readable medium --

Column 10, Line 39 delete "The computer program" and insert -- The machine-readable medium --

Signed and Sealed this

Twenty-ninth Day of January, 2008

JON W. DUDAS
*Director of the United States Patent and Trademark Office*